United States Patent
Nakamura et al.

(10) Patent No.: US 7,866,378 B2
(45) Date of Patent: Jan. 11, 2011

(54) DOUBLE-WALL PIPE, METHOD OF MANUFACTURING THE SAME AND REFRIGERANT CYCLE DEVICE PROVIDED WITH THE SAME

(75) Inventors: Fumiaki Nakamura, Kariya (JP); Yoshiaki Takano, Kosai (JP); Shun Kurata, Kariya (JP); Takahisa Suzuki, Nagoya (JP); Takashi Ono, Okazaki (JP); Hiroki Naganawa, Nishio (JP); Kinji Ochiai, Kasugai (JP); Hiroki Ohara, Kariya (JP)

(73) Assignees: Denso Corporation, Kariya (JP); Denso Airs Corporation, Anjo (JP)

( * ) Notice: Subject to any disclaimer, the term of this patent is extended or adjusted under 35 U.S.C. 154(b) by 1125 days.

(21) Appl. No.: 11/269,265

(22) Filed: Nov. 8, 2005

(65) Prior Publication Data

US 2006/0096744 A1    May 11, 2006

(30) Foreign Application Priority Data

| Nov. 9, 2004 | (JP) | ............................. 2004-325521 |
| Nov. 9, 2004 | (JP) | ............................. 2004-325522 |
| Apr. 8, 2005 | (JP) | ............................. 2005-112825 |
| May 9, 2005 | (JP) | ............................. 2005-136390 |
| Sep. 12, 2005 | (JP) | ............................. 2005-263967 |

(51) Int. Cl.
  *F28D 7/14* (2006.01)
  *F28D 7/10* (2006.01)
  *F28F 1/06* (2006.01)
  *F28F 9/013* (2006.01)

(52) U.S. Cl. ........................ 165/156; 165/154; 165/163; 165/164; 165/178; 138/114; 62/513; 72/77; 72/78; 72/95; 72/98; 72/100; 72/370.19; 72/370.21; 29/890.036

(58) Field of Classification Search .................. 165/41, 165/154, 155, 156, 178, 164, 163; 138/114; 62/513; 72/77, 78, 95, 98, 100, 370.19, 370.21; 29/890.036
See application file for complete search history.

(56) References Cited

U.S. PATENT DOCUMENTS 2,173,665 A    9/1939    Sibley (Continued)

FOREIGN PATENT DOCUMENTS

CN    1134324 A    10/1996

(Continued)

OTHER PUBLICATIONS

Office Action dated Oct. 11, 2007 in corresponding German Application No. 05052973.9 with English translation.

(Continued)

*Primary Examiner*—John K Ford
(74) *Attorney, Agent, or Firm*—Harness, Dickey & Pierce, PLC

(57) ABSTRACT

A double-wall pipe includes an outer pipe, and an inner pipe disposed inside the outer pipe. An outer wall of the inner pipe has thereon a ridge portion, which defines a groove portion extending in a longitudinal direction of the inner pipe. The outer pipe and the inner pipe are bent to have a straight portion extending straightly, and a bend portion bent from the straight portion. In the straight portion, the outer pipe has an inside diameter that is larger than an outside diameter of an imaginary cylinder defined by an outer surface of the ridge portion of the inner pipe. Furthermore, the ridge portion of the inner pipe contacts an inside surface of the outer pipe to be readially squeezed and held by the outer pipe, in the bend portion. The double-wall pipe can be suitably used for a refrigerant cycle device.

16 Claims, 9 Drawing Sheets

U.S. PATENT DOCUMENTS

| | | | |
|---|---|---|---|
| 2,508,517 A | 5/1950 | Hill | |
| 2,817,363 A | 12/1957 | Penrose | |
| 3,273,916 A | 9/1966 | Tillery | |
| 3,501,179 A | 3/1970 | Hoynton et al. | |
| 3,606,780 A | 9/1971 | Nagahara | |
| 3,672,196 A | 6/1972 | Levacher et al. | |
| 3,722,583 A * | 3/1973 | Fiedler | 165/156 |
| 3,730,229 A * | 5/1973 | D'Onofrio | 138/114 |
| 3,777,343 A | 12/1973 | D'Onofrio | |
| 3,864,937 A | 2/1975 | Asher et al. | |
| 3,893,322 A | 7/1975 | Campbell et al. | |
| 4,004,634 A | 1/1977 | Habdas | |
| 4,194,560 A | 3/1980 | Matsuzaki | |
| 4,196,608 A | 4/1980 | Amado, Jr. | |
| 4,199,955 A * | 4/1980 | Jonsson | 165/154 |
| 4,207,744 A | 6/1980 | Takeshita et al. | |
| 4,299,106 A | 11/1981 | Hague | |
| 4,457,143 A | 7/1984 | Takeshita et al. | |
| 5,052,190 A | 10/1991 | Gregory | |
| 5,088,192 A | 2/1992 | Dempsey | |
| 5,333,472 A | 8/1994 | Bae et al. | |
| 5,365,763 A | 11/1994 | Cretin et al. | |
| 6,000,267 A | 12/1999 | Yagi | |
| 6,009,908 A | 1/2000 | Hartnagel et al. | |
| 6,098,704 A | 8/2000 | Tsuchiya et al. | |
| 6,131,615 A | 10/2000 | Hartnagel et al. | |
| 6,220,344 B1 | 4/2001 | Beykirch et al. | |
| 6,434,972 B1 | 8/2002 | Geiger et al. | |
| 6,658,717 B2 | 12/2003 | Takasaki et al. | |
| 6,840,074 B2 | 1/2005 | Kamino et al. | |
| 6,866,090 B2 | 3/2005 | Takamatsu et al. | |
| 6,883,601 B2 | 4/2005 | Ullrich et al. | |
| 6,920,919 B2 | 7/2005 | Wilson et al. | |
| 6,935,414 B2 | 8/2005 | Kawakubo et al. | |
| 2004/0169369 A1 | 9/2004 | Takamatsu et al. | |
| 2004/0178627 A1 | 9/2004 | Takasaki | |
| 2004/0188071 A1 | 9/2004 | Wison et al. | |
| 2004/0244411 A1 | 12/2004 | Ichimura et al. | |
| 2004/0261450 A1* | 12/2004 | Yoshino et al. | 62/513 |

FOREIGN PATENT DOCUMENTS

| | | |
|---|---|---|
| CN | 2570568 Y | 9/2003 |
| DE | 6930647 U | 4/1970 |
| DE | 115 436 | 10/1975 |
| DE | 3443085 A1 | 6/1985 |
| DE | 36 27 121 | 2/1988 |
| DE | 8717356 U1 | 3/1989 |
| DE | 200 22 757 | 4/2002 |
| EP | 0 108 525 | 5/1984 |
| EP | 1 136 780 | 9/2001 |
| FR | 2 853 051 | 3/2004 |
| JP | 52-149452 | 5/1951 |
| JP | 155-133167 | 3/1954 |
| JP | 57-037690 | 3/1982 |
| JP | 57-047378 Y2 | 10/1982 |
| JP | 58-093677 | 6/1983 |
| JP | 60048496 A * | 3/1985 |
| JP | A-61-209729 | 9/1986 |
| JP | 62-056968 | 4/1987 |
| JP | U-1-61566 | 4/1989 |
| JP | 03-077708 | 4/1991 |
| JP | 5-47756 | 6/1993 |
| JP | 5-184533 | 7/1993 |
| JP | 6-85944 | 11/1994 |
| JP | 07-18092 | 3/1995 |
| JP | U-07-018092 | 3/1995 |
| JP | 07-256336 | 10/1995 |
| JP | 10-038491 | 2/1998 |
| JP | 10-249445 A | 9/1998 |
| JP | 10-323730 | 12/1998 |
| JP | 11-197739 | 7/1999 |
| JP | 2000-118231 A | 4/2000 |
| JP | 2001-153580 | 6/2001 |
| JP | A-2001-235081 | 8/2001 |
| JP | 2001-323814 A | 11/2001 |
| JP | 2002-013882 | 1/2002 |
| JP | 2002-13882 | 1/2002 |
| JP | 2002-239670 | 8/2002 |
| JP | 2002-318015 | 10/2002 |
| JP | 2002-318083 | 10/2002 |
| JP | 2002-364795 | 12/2002 |
| JP | 2003-329376 | 11/2003 |
| JP | 2004-245389 | 9/2004 |
| JP | 2004-306686 A | 11/2004 |
| JP | 2006-046846 | 2/2006 |
| KR | 2003-0038599 A | 5/2003 |
| KR | 2003-0096170 | 12/2003 |
| WO | WO 85/01093 A1 | 3/1985 |
| WO | WO 99/20968 | 4/1999 |
| WO | WO 03/036212 | 5/2003 |

OTHER PUBLICATIONS

Co-pending U.S. Appl. No. 11/269,257, filed Nov. 8, 2005, Nakamura et al.
Co-pending U.S. Appl. No. 11/269,258, filed Nov. 8, 2005, Nakamura et al.
Office Action dated Mar. 14, 2009 in corresponding Chinese Application No. 2005 1012 0281.5 with English translation.
Office Action issued in the corresponding Japanese patent application No. 2004-325521 on Mar. 3, 2009.
Office Action issued in corresponding Chinese patent application No. 2005 1012 0012.9 dated Apr. 6, 2007 and English translation.
Office action dated Apr. 21, 2009 in Japanese Application No. 2005-263967.
Office action dated Apr. 28, 2009 in Japanese Application No. 2005-112825.
Office Action dated May 10, 2006 in corresponding German Application No. 10 2005 052 974.7 with English translation.
Office Action dated Jun. 29, 2007 in corresponding Chinese Application No. 2005 10120011.4 with English translation.
Notice of Final Rejection issued on Oct. 5, 2007 in the corresponding Korean Patent Application No. 10-2005-0107163 with translation.
Notice of Preliminary Rejection dated Nov. 7, 2006 in corresponding Korean patent application No. 10-2005-0107163.
Notice of Preliminary Rejection dated Nov. 7, 2006 in corresponding Korean patent application No. 10-2005-0107149.
Office Action issued in the corresponding German patent application No. 102005052973.9 dated Aug. 26, 2009 with English translation.
Office action dated Jul. 7, 2009 in Japanese Application No. 2004-325521 with English Translation.
Office action dated Aug. 14, 2009 in corresponding U.S. Appl. No. 11/269,258.
Office Action dated Jul. 2, 2010 in France Application No. 0511362.
Office Action dated Feb. 17, 2010 in the corresponding JP Application No. 2005-136390 with English translation.
1st Office Action in the related U.S. Appl. No. 11/269,257 dated Feb. 1, 2008.
Final Office Action in the related U.S. Appl. No. 11/269,257 dated Sep. 11, 2008.
1st Office Action in the related DE Application No. 102005052972.0 dated Mar. 27, 2008.
2nd Office Action in the related DE Application No. 102005052972.0 dated Nov. 4, 2009.
2nd Office Action in the related CN Application No. 200510120011.4 dated May 9, 2008.
3rd Office Action in the related CN Application No. 200510120011.4 dated Aug. 7, 2009.
2nd Office Action in the related DE Application No. 102005052974.7 dated Jan. 29, 2007.
3rd Office Action in the related DE Application No. 102005052974.7 dated Nov. 4, 2009.

1st Office Action in the related DE Application No. 102005063359.5 (which is a divisional application of DE Application No. 102005052974.7) dated Jan. 16, 2007.

1st Office Action in the related U.S. Appl. No. 11/269,258 dated Jan. 6, 2009.

1st Office Action in the related U.S. Appl. No. 11/269,258 dated Apr. 5, 2010.

Search Report in the related FR Application No. 05/11422 dated Nov. 29, 2007.

2nd Office Action in the corresponding DE Application No. 102005052973.9 dated Jul. 30, 2008.

Office Action dated May 27, 2010 in Chinese Application No. 200510120011.4.

Patent Court Decision dated Jul. 28, 2010 in corresponding Korean Patent No. 838676.

Office action dated Nov. 9, 2010 in co-pending U.S. Appl. No. 11/269,258.

* cited by examiner

DOUBLE-WALL PIPE, METHOD OF MANUFACTURING THE SAME AND REFRIGERANT CYCLE DEVICE PROVIDED WITH THE SAME

CROSS REFERENCE TO RELATED APPLICATION

This application is based on Japanese Patent Applications No. 2004-325522 filed on Nov. 9, 2004, No. 2004-325521 filed on Nov. 9, 2004, No. 2005-112825 filed on Apr. 8, 2005, No. 2005-136390 filed on May 9, 2005, and No. 2005-263967 filed on Sep. 12, 2005, the contents of which are incorporated herein by reference.

BACKGROUND OF THE INVENTION

1. Field of the Invention

The present invention relates to a double-wall pipe having at least a part constructed of an inner pipe defining an inner passage and an outer pipe enveloping the inner pipe so as to define an outer passage together with the inner pipe, and a method of manufacturing a double-wall pipe. The double-wall pipe can be suitably used for a refrigerant cycle device.

2. Description of the Related Art

A double-wall pipe disclosed in JP-A-2002-318083 includes an inner pipe, and an outer pipe enveloping the inner pipe so as to define a passage together with the inner pipe. The double-wall pipe is capable of performing heat exchange between a first fluid flowing in the inner pipe and a second fluid flowing through the passage between the inner pipe and the outer pipe.

The double-wall pipe is provided in a part thereof with a core held in the outer pipe, and the inner pipe is extended through the core. The part provided with the core of the double-wall pipe is bent by a bending process using a pipe bender to form a bend portion. The bend portion is formed through the bending process, so that lines may not be formed in the bend portion, the bend portion may not be irregularly bent, and the section of the double-wall pipe may not be flattened.

Since the inner pipe and the outer pipe are separated by a space, it is possible that the inner pipe and the outer pipe vibrate, resonate, strike each other, and generate noise when external force is applied to the double-wall pipe.

SUMMARY OF THE INVENTION

In view of the foregoing problem, it is an object of the present invention to provide a double-wall pipe having a passage between an outer pipe and an inner pipe inside of the outer part, which holds and fixes the outer and the inner pipe with a simple structure.

It is another object of the present invention to provide a method of manufacturing a double-wall pipe, and a refrigerant cycle device using a double-wall pipe.

According to an aspect of the present invention, in a double-wall pipe includes an outer pipe and an inner pipe disposed inside the outer pipe, the inner pipe has thereon a ridge portion which defines a groove portion extending in a longitudinal direction of the inner pipe, and the outer pipe and the inner pipe are bent to have a straight portion extending straightly and a bend portion bent from the straight portion. Furthermore, the outer pipe has an inside diameter that is larger than an outside diameter of an imaginary cylinder defined by an outer surface of the ridge portion of the inner pipe in the straight portion, and the ridge portion of the inner pipe contacts an inside surface of the outer pipe to be readially squeezed and held by the outer pipe in the bend portion. For example, the groove portion is a helical groove portion winding around the inner pipe.

Accordingly, the groove portion forms a passage between the outer pipe and the inner pipe in the bend portion, and a part of the outer pipe and a part of the inner pipe can be fixedly held in the bend portion by a simple structure. Therefore, even when an external force, such as a vibratory force, is applied to the double-wall pipe, the outer pipe and the inner pipe can be prevented from resonation, and generation of noise and breakage of the double-wall pipe can be prevented.

When the helical groove is provided on the outer surface of the inner pipe, the helical groove reduces strains in the bend portion and facilitates bending the inner pipe. In this case, a force necessary for bending the double-wall pipe can be effectively reduced.

For example, the helical groove portion includes helical grooves. In this case, even when one of the helical grooves is destroyed in the bend portion, the rest of the helical grooves can be used as the passage between the outer pipe and the inner pipe. Since the helical grooves enlarge the passage, resistance against the flow of the fluid through the passage can be reduced.

The groove portion has a groove depth that is in a range of 5% to 15% of an outside diameter of the inner pipe, for example. In this case, heat exchange between a fluid inside the inner pipe and a fluid flowing through the passage between the inner pipe and the outer pipe can be effectively increased while a flow resistance can be reduced.

The resistance of the inner pipe against the flow of the fluid flowing in the inner pipe increases in proportion to the length of the inner pipe. Further, a temperature difference between the fluid flowing in the inner pipe and the fluid flowing through the passage between the outer and the inner pipe decreases as the length of the groove portion increases. When a longitudinal length of the groove portion is set in a range of 300 mm to 800 mm, the heat exchange efficiency can be effectively increased. Furthermore, the longitudinal length of a helical groove can be set in a range between 600 mm and 800 mm.

An outside diameter of the outer pipe can be set in a range of 1.1 to 1.3 times of an outside diameter of the inner pipe. When a pipe is bent, a tensile force acts on the outer side of the pipe and the length of the outer side increases. Therefore, the outside diameter of the pipe decreases by 10 to 30%. Thus, the inside diameter of the outer pipe decreases by 10 to 30%. In this case, the outer pipe and the inner pipe can be surely fixed together.

Further, a minimum outside diameter of the outer pipe in the bend portion can be set equal to or larger than 0.85 times of an outside diameter of the outer pipe in the straight portion. In this case, the deformation of a round section of the outer pipe into an elliptic section in the bend portion can be controlled, the extending deformation of the bend portion by the high-pressure fluid flowing through the passage inside the outer pipe can be controlled, the strain of the outer pipe can be limited, and the outer pipe is prevented from breakage.

The outside diameter of the imaginary cylinder defined by the outer surface of the ridge portion of the inner pipe in the straight portion can be set in a range of 0.7 to 0.95 of the inside diameter of the outer pipe in the straight portion.

When the double-wall pipe is bent through an angle of 10° or above, the smallest inside diameter of the outer pipe in the bend portion is 70% of the original inside diameter or below. Therefore the outer pipe and the inner pipe can be surely fixed together in the bend portion and the double-wall pipe is resistant to vibration when the diameter of a circular imaginary cylinder defined by the outer surface of the ridge portion is 70% of the original inside diameter of the outer pipe or above. When the outer pipe does not have high straightness, it is difficult to insert the inner pipe into the outer pipe and the productivity of the double-wall pipe manufacturing line lowers. Therefore, it is desirable that an outside diameter of an imaginary cylinder defined by the outer surface of the ridge portion of the inner pipe is 95% of the inside diameter of the outer pipe or below.

A branch pipe can be connected to an outer pipe, and a connecting pipe can be connected to an end of the inner pipe. In this case, the branch pipe and the connecting pipe can be fixed using a holding member to have a predetermined positional relation. Furthermore, the holding member can be brazed to the branch pipe and the connecting pipe, or can be fitted to the branch pipe and the connecting pipe. In addition, the branch pipe can be disposed to have a deformable portion for adjusting an end position of the branch pipe. For example, the deformable portion is a bending portion provided in the branch pipe.

The double-wall pipe can be suitably used for a refrigerant cycle device having one or two refrigerant circuits.

According to another aspect of the present invention, a method of manufacturing a double-wall pipe includes a step of forming a groove portion extending in a longitudinal direction on an outer wall of the inner pipe so as to form thereon a ridge portion defining the groove portion, a step of inserting the inner pipe into the outer pipe having an inside diameter greater than an outside diameter of an imaginary cylinder defined by an outer surface of the ridge portion of the inner pipe after the groove portion is formed, and a step of bending a part of both the inner pipe and the outer pipe after the inserting step, to form a bend portion in such a manner that the ridge portion contacts an inside surface of the outer pipe and the outer pipe squeezes the inner pipe radially to hold and fix the inner pipe therein in the bend portion. In this case, the double-wall pipe can be easily formed.

In the forming step of the groove portion, a helical groove of the groove portion extending helically in the longitudinal direction can be formed by deforming radially inside the outer wall of the inner pipe.

BRIEF DESCRIPTION OF THE DRAWINGS

The above and other objects, features and advantages of the present invention will become more apparent from the following detailed description of preferred embodiments made with reference to the accompanying drawings, in which.

DESCRIPTION OF THE PREFERRED EMBODIMENTS

First Embodiment

Figure 1:
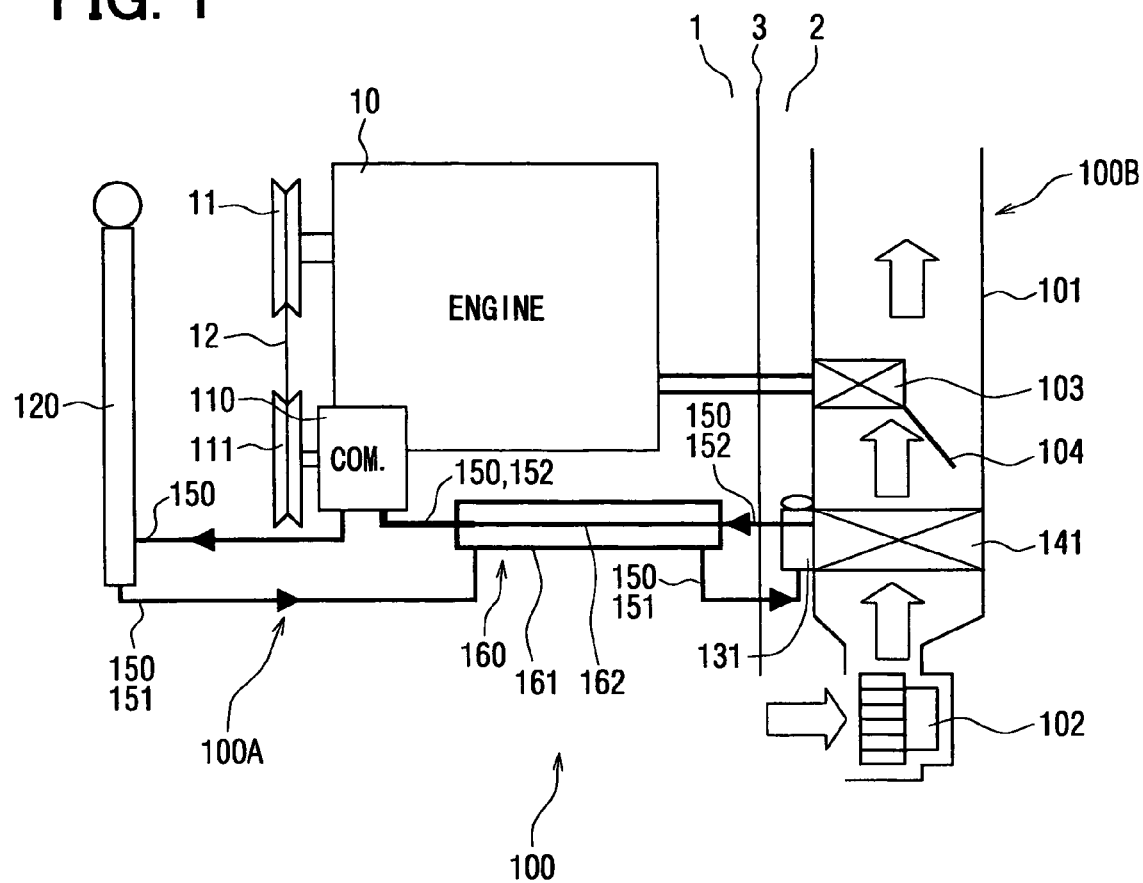
FIG. 1 is a schematic view of an automotive air conditioning system.
Figure 2:
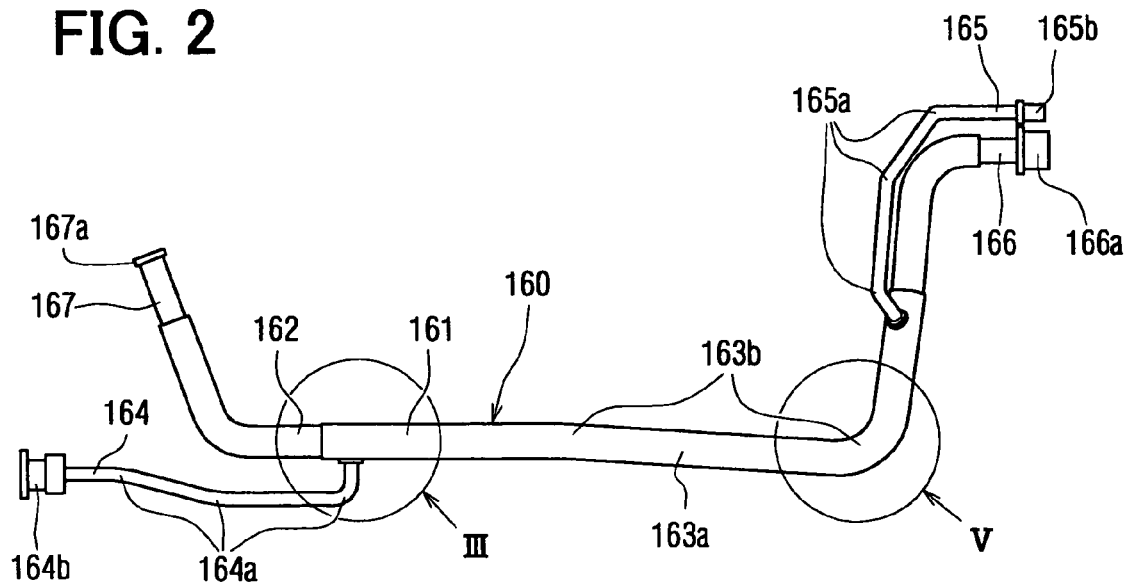
FIG. 2 is a side view of a double-wall pipe in a preferred embodiment according to the present invention.
Figure 3:
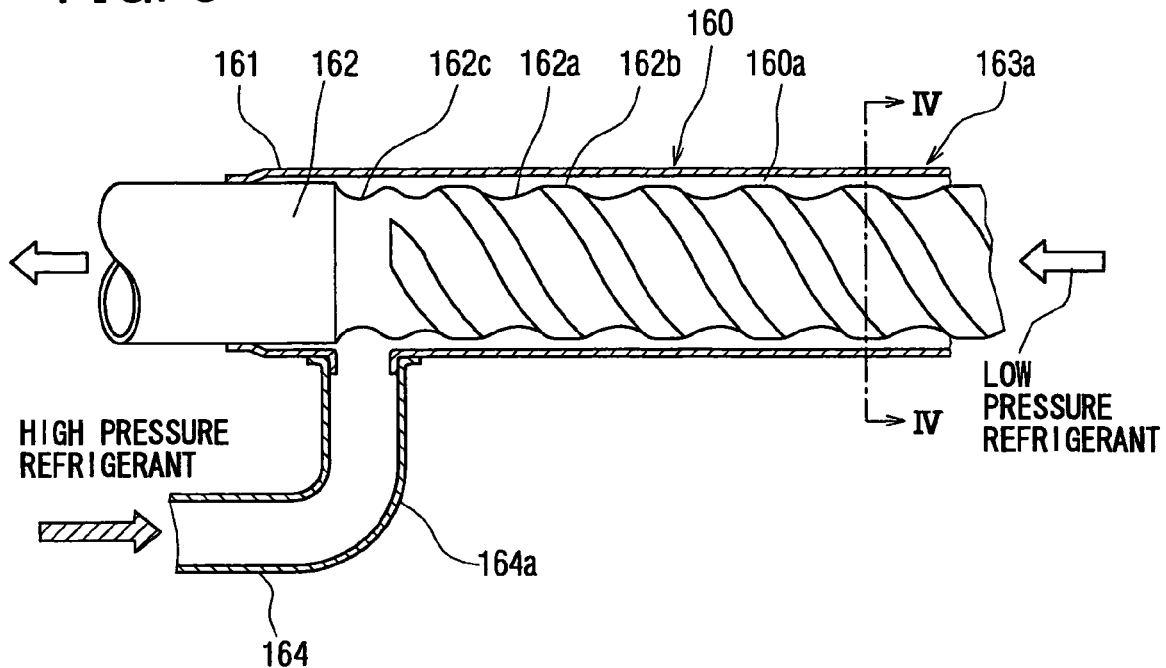
FIG. 3 is a sectional view of a part III in FIG. 2.
Figure 4:
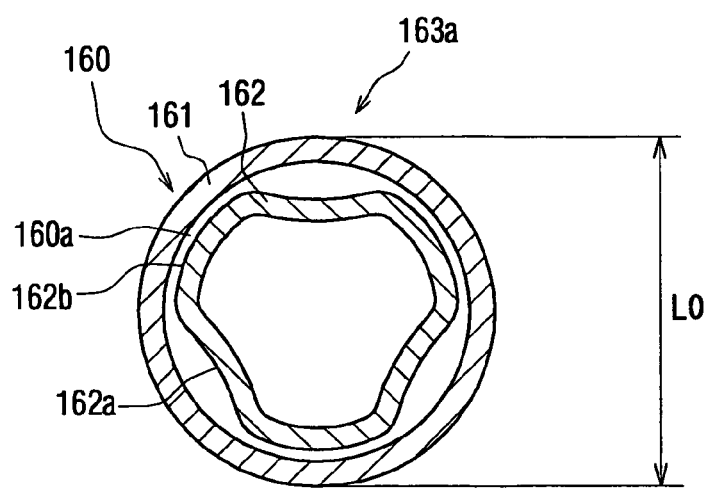
FIG. 4 is a cross-sectional view taken along the line IV-IV in FIG. 3.
Figure 5:
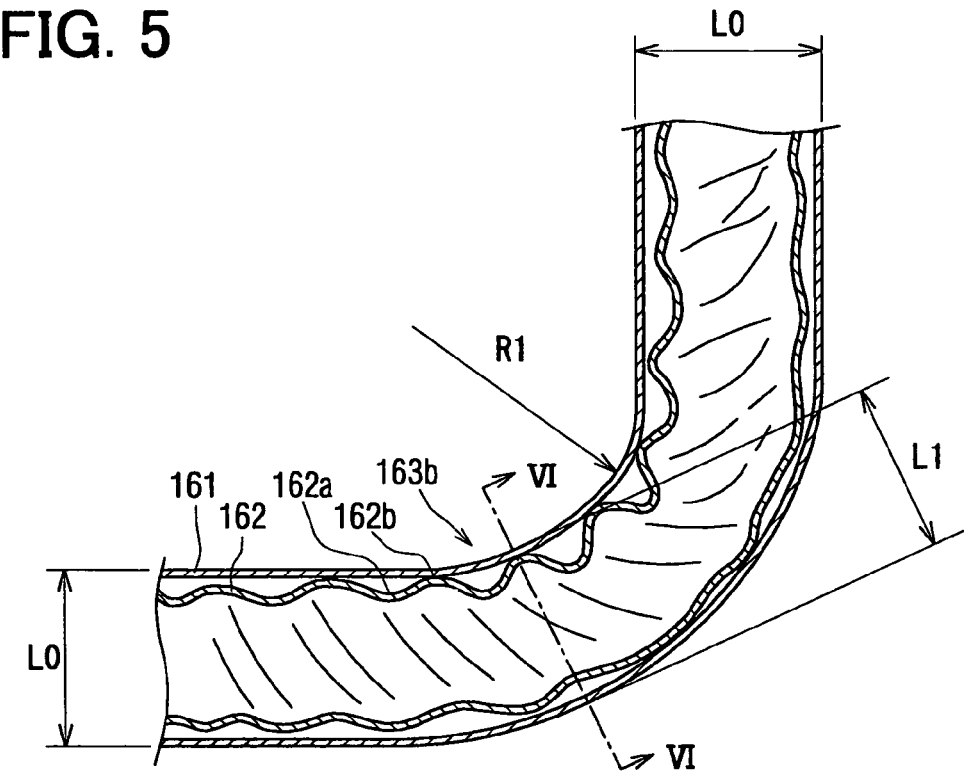
FIG. 5 is a sectional view of a part V in FIG. 2.
Figure 6:
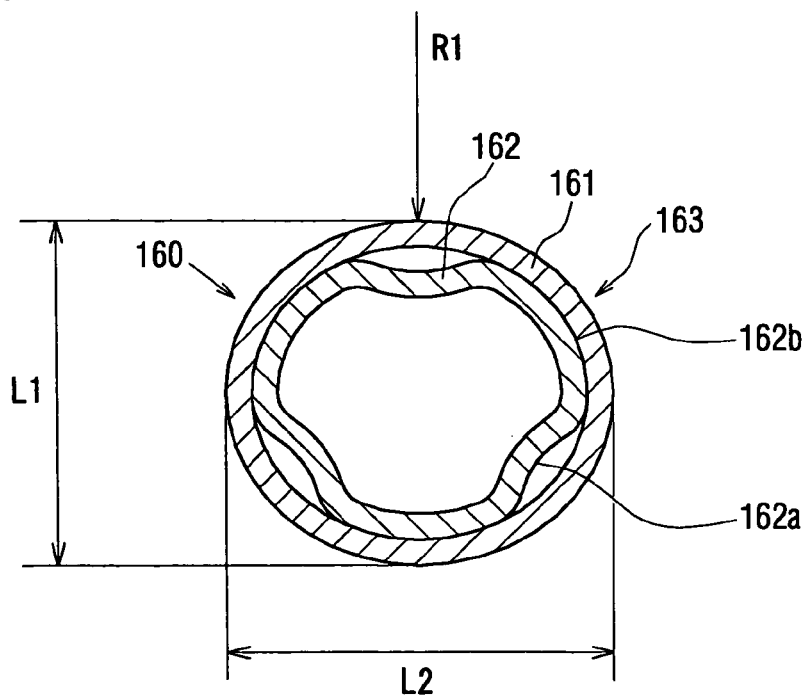
FIG. 6 is a cross-sectional view taken along the line VI-VI in FIG. 5.
Figure 7:
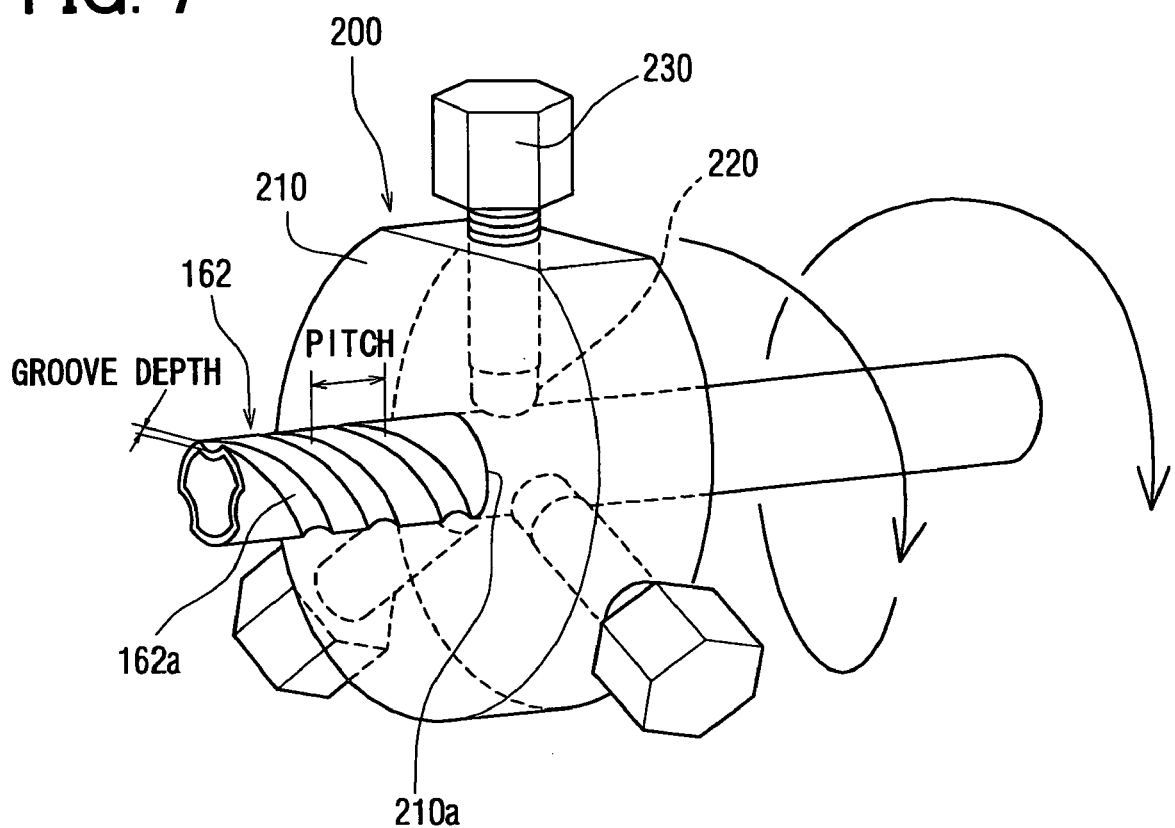
FIG. 7 is a perspective view showing a grooving device for forming helical grooves on an inner pipe.

A double-wall pipe 160 in a first embodiment according to the present invention is typically used for a refrigerant cycle device 100A of a vehicle air conditioning system 100. The double-wall pipe 160 will be described with reference to FIGS. 1 to 5. FIG. 1 is a schematic view of the air conditioning system 100, FIG. 2 is a view of the double-wall pipe 160, FIG. 3 is a sectional view of a part III of the double-wall pipe 160 in FIG. 2, FIG. 4 is a cross-sectional view showing a straight part 163a, FIG. 5 is a sectional view showing a bend portion 163b in FIG. 2, FIG. 6 is a cross-sectional view of a bend portion 163b, and FIG. 7 is a perspective view of a grooving device 200 for forming helical grooves 162a in an inner pipe 162.

A vehicle has an engine room 1 holding an engine 10 therein and a passenger compartment 2 separated from the engine room 1 by a dash panel 3. The air conditioning system 100 has the refrigerant cycle device 100A including an expansion valve 131 and an evaporator 141, and an interior unit 100B. Components of the refrigerant cycle device 100A excluding the expansion valve 131 and the evaporator 141 are disposed in a predetermined mounting space of the engine room 1. The interior unit 100B is arranged in an instrument panel placed in the passenger compartment 2.

The interior unit 100B has components including a blower 102, the evaporator 141 and a heater 103 and an air conditioner case 101 housing the components of the interior unit 100B. The blower 102 takes in outside air or inside air selectively and sends air to the evaporator 141 and the heater 103. The evaporator 141 is a cooling heat exchanger that evaporates a refrigerant used for a refrigeration cycle to make the evaporating refrigerant absorb latent heat of vaporization from air so as to cool the air. The heater 103 uses hot water (e.g., engine-cooling water) for cooling the engine 10 as heat source to heat air to be blown into the passenger compartment 2.

An air mixing door 104 is disposed near the heater 103 in the air conditioner case 101. The air mixing door 104 is operated to adjust the mixing ratio between cool air cooled by the evaporator 141 and hot air heated by the heater 103 so that air having a desired temperature is sent into the passenger compartment 2.

The refrigerant cycle device 100A includes a compressor 110, a condenser 120, the expansion valve 131 and the evaporator 141. Pipes 150 connect those components of the refrigerant cycle device 100A to form a closed circuit. At least one double-wall pipe 160 of the present invention can be placed in the pipes 150. The condenser 120 (refrigerant radiator, gas cooler) serves as a high-pressure heat exchanger for cooling high-pressure high-temperature refrigerant. The evaporator 141 serves as a low-pressure heat exchanger and is disposed to cool air passing therethrough. The expansion valve 131 is a pressure reducer, such as a throttle and an ejector.

The compressor 110 is driven by the engine 10 to compress a low-pressure refrigerant to provide a high-temperature high-pressure refrigerant in the refrigerant cycle device 100A. A pulley 111 is attached to the drive shaft of the compressor 110. A drive belt 12 is extended between the pulley 111 and a crankshaft pulley 11 to drive the compressor 110 by the engine 10. The pulley 111 is linked to the drive shaft of the compressor 110 by an electromagnetic clutch (not shown). The electromagnetic clutch connects the pulley 111 to or disconnects the pulley 111 from the drive shaft of the compressor 110. The condenser 120 is connected to a discharge side of the compressor 110. The condenser 120 is a heat exchanger that cools the refrigerant by outside air to condense the refrigerant vapor into liquid refrigerant.

The expansion valve 131 reduces the pressure of the refrigerant (liquid refrigerant) discharged from the condenser 120 and makes the refrigerant expand. The expansion valve 131 is a pressure-reducing valve capable of reducing the pressure of the liquid refrigerant in an isoentropic state. The expansion valve 131 included in the interior unit 100B is placed near the evaporator 141. The expansion valve 131 is a temperature-controlled expansion valve having a variable orifice and is capable of controlling the flow of the refrigerant discharged from the evaporator 141 and flowing into the compressor 110 so that the refrigerant is heated at a predetermined degree of superheat. The expansion valve 131 controls the expansion of the refrigerant so that the degree of superheat of the refrigerant in the evaporator 141 is, for example, 5° C. or below, more specifically, in the range of 0° C. to 3° C. As described above, the evaporator 141 is a cooling heat exchanger for cooling air to be blown into the passenger compartment. The discharge side of the evaporator 141 is connected to the suction side of the compressor 110.

The double-wall pipe 160 is formed by combining a part of a high-pressure pipe 151 and a part of a low-pressure pipe 152 in the pipes 150. The high-pressure pipe 151 extends between the condenser 120 and the expansion valve 131 to carry the high-pressure refrigerant before being decompressed. The low-pressure pipe 152 extends between the evaporator 141 and the compressor 110 to carry a low-temperature low-pressure refrigerant after being decompressed and cooled.

For example, the double-wall pipe 160 has a length in the range of 700 to 900 mm. As shown in FIGS. 2 to 6, the double-wall pipe 160 has a straight part 163a having an outside diameter L0 and a plurality of bend portions 163b and is extended in the engine room 1 so that the double-wall pipe 160 may not touch the engine 10 and other equipments and the body of the vehicle.

The double-wall pipe 160 has an outer pipe 161 and an inner pipe 162. The inner pipe 162 is inserted into the outer pipe 161. The outer pipe 161 is, for example, a 22 mm diameter aluminum pipe having an outside diameter L0 of 22 mm and an inside diameter of 19.6 mm. End parts of the outer pipe 161 are reduced after connecting the outer pipe 161 and the inner pipe 162, to form reduced joining parts. The reduced joining parts of the outer pipe 161 are air-tightly welded to the inner pipe 162 having an outside diameter of 19.1 mm. In this embodiment, the outside diameter of the inner pipe 162 in the part having the helical grooves 162a corresponds to the diameter of an imaginary cylinder connecting the outside surfaces of ridges 162b of the inner pipe 162. After the helical grooves 162a are formed, the maximum outside diameter of the inner pipe 162 in the part having the helical grooves 162a corresponds to the outside diameter of the imaginary cylinder defined by the outside surfaces of the ridges 162b of the inner pipe 162. Thus, the outer pipe 161 and the inner pipe 162 define a passage 160a therebetween. For example, the ratio of the outside diameter of the outer pipe 161 to the outside diameter of the inner pipe 162 corresponding to the diameter of the imaginary cylinder connecting the outside surfaces of the ridges 162b of the inner pipe 162 is 1.2 (=22/19.1). In this embodiment, the outside diameter of the outer pipe 161 can be set in a range of 1.1 to 1.3 times of the outside diameter of the inner pipe 162. Further, when the ratio is set in a range between 1.1 and 1.2, the performance of the double-wall pipe 160 can be further improved.

Liquid tubes 164 and 165 (high-pressure refrigerant pipes) made of aluminum, that is, branch pipes, are connected to end parts of the outer pipe 161 by blazing so as to communicate with the passage 160a. The liquid pipe 164 has plural bend portions 164a (e.g., three) and extends to the condenser 120. A joint 164b is attached to the free end of the liquid tube 164. The liquid tube 165 has plural bend portions 165a (e.g., three) and extends to the expansion valve 131. A joint 165b is attached to the free end of the liquid tube 165. The joint 164b is connected to the condenser 120 and the joint 165b is connected to the expansion valve 131. Therefore, the high-pressure refrigerant from the condenser 120 flows through the liquid tube 164, the passage 160a and the liquid tube 165.

The inner pipe 162 is, for example, a ¾ in. aluminum pipe having an outside diameter of 19.1 mm and an inside diameter of 16.7 mm. The outside diameter of the inner pipe 162 is determined so that the passage 160a has a sectional area large enough to pass the high-pressure refrigerant, and the outer surface of the inner pipe 162 is as close to the inner surface of the outer pipe 161 as possible. Thus, the inner pipe 162 has the largest possible heat transfer surface area.

Suction pipes 166 and 167 made of aluminum are also used as a part of the low-pressure pipes 152. The suction pipes 166 and 167 are connected to the end parts of the inner pipe 162, respectively. The suction pipe 166 is positioned at the side of the liquid tube 165, and the suction pipe 167 is positioned at the side of the liquid tube 164, as shown in FIG. 2. Joints 166a and 167a are attached to the free ends of the suction pipes 166 and 167, respectively. The joints 166a and 167a are connected to the evaporator 141 and the compressor 110, respectively. Thus, the low-pressure refrigerant flows through the suction pipe 166, the inner pipe 162 and the suction pipe 167.

Annular grooves 162c (e.g., two) and helical grooves 162a (e.g., three) are formed on the surface of a part, corresponding to the passage 160a, of the inner pipe 162. The annular grooves 162c are provided at positions corresponding to the joint portion between the liquid tube 164 and the outer pipe 161 and the joint portion between the liquid tube 165 and the outer pipe 161, respectively. Each of the annular grooves 162c is a circumferential groove extending in a circumferential direction at least by a predetermined angle. The helical grooves 162a communicate with the annular grooves 162c and extend between the two annular grooves 162c. Ridges 162b are formed on the outer wall surface of the inner pipe 162. The helical grooves 162a and the ridges 162b are arranged circumferentially alternately to extend in a pipe longitudinal direction. The diameter of an imaginary cylinder connecting the outer surfaces of the ridges 162b is substantially equal to or slightly smaller than the outside diameter of the inner pipe 162. The annular grooves 162c and the helical grooves 162a enlarge the passage 160a between the inner pipe 162 and the outer pipe 161.

The grooved depth of the helical grooves 162a, that is, half the difference between the diameter of an imaginary cylinder connecting the outer surfaces of the ridges 162b and the diameter of an imaginary cylinder connecting the bottom surfaces of the helical grooves 162a, is in the range of 5 to 15% of the outside diameter of the inner pipe 162, that is, the diameter of the imaginary cylinder connecting the outer surfaces of the ridges 162b, based on the performance of the double-wall pipe 160. The length of the helical grooves 162a along a pipe longitudinal direction is set in a range between 300 and 800 mm. The length of the helical grooves 162a corresponds to the length of a part, in which the helical grooves 162a are formed, of the inner pipe 162.

The annular grooves 162c and the helical groove 162a of the inner pipe 162 can be formed by a grooving tool 200 shown in FIG. 7 by way of example. The grooving tool 200 has an annular block 210, three balls 220 and three bolts 230 for determining and adjusting the positions of the balls 220. The annular block 210 is provided with a center hole 210a in which the inner pipe 162 is inserted, and three internally threaded radial bores. The balls 220 are disposed into the bores and the bolts 230 are screwed into the radial bores. The bolts 230 are turned to adjust the radial positions of the balls 220 so that the balls 220 protrude from the inner ends of the radial bores by a predetermined distance. The three sets, each of which has the ball 220 and the bolt 230, form the three helical grooves 162a. The inner pipe 162 is inserted into the center hole 210a, the longitudinal end parts of the inner pipe 162 are fixedly held by holding devices (not shown), and then the bolts 230 are turned to press the balls 220 to the surface of the inner pipe 162 by a predetermined depth corresponding to the depth of the helical grooves 162a.

Then, the annular block 210 holding the balls 220 and the bolts 230 is turned, so as to form the annular grooves 162c. Subsequently, the annular block 210 is rotated and is moved along the longitudinal axis of the inner pipe 162, so as to form the helical grooves 162a. The moving speed of the annular block 210 is adjusted so that the helical grooves 162a are formed at desired pitches. After the helical grooves 162a have been formed, the annular block 210 is kept rotating while the longitudinal movement of the annular block 210 is stopped, so as to form the other annular groove 162c.

Referring to FIGS. 5 and 6, in the bend portion 163b of the double-wall pipe 160 in the first embodiment, the ridges 162b are in contact with the inside surface of the outer pipe 161 and the outer pipe 161 squeezes the inner pipe 162, thereby holding the inner pipe fixedly in the outer pipe 161. A desired part of the double-wall pipe 160 is bent to form the bend portion 163b, after inserting the inner pipe 162 provided with the annular grooves 162c and the helical grooves 162a into the outer pipe 161. In this case, a part, corresponding to the bend portion 163b, of the outer pipe 161 is deformed and the round cross section of the same part of the outer pipe 161 changes into an elliptic cross section before the inner pipe 162 is deformed. Consequently, the outer pipe 161 comes into contact with the ridges 162b and squeezes the inner pipe 162 radially so as to hold the inner pipe 162 fixedly in the outer pipe 161.

As shown in FIG. 5, the bend portion 163b is formed such that inner side of the part, corresponding to the bend portion 163b, of the outer pipe 161 is curved in a circular shape having a radius R1 of curvature. The bend portion 163b may contain an angle of about 90°. As shown in FIG. 6, the part, corresponding to the bend portion 163b, of the outer pipe 161 is deformed so that the round cross section thereof is changed into an elliptic cross section. A part, corresponding to a middle part of the bend portion 163b, of the outer pipe 161 has a major axis of a length L2 greater than the original outside diameter L0, and a minor axis of a length L1 shorter than the length L2. When the outer pipe 161 is deformed, the ridges 162b defining the helical grooves 162a of the inner pipe 162 come into contact with the inside surface of the outer pipe 161. Thus, the outer pipe 161 squeezes the inner pipe 162 radially to hold the inner pipe 162 fixedly therein.

The outside diameter of the inner pipe 162, that is, the diameter of an imaginary cylinder connecting the outer surfaces of the ridges 162b, is in the range of 0.7 to 0.95 or 0.8 to 0.95 times of the original inside diameter of the outer pipe 161 to enable the outer pipe 161 to hold the inner pipe 162 fixedly therein.

At least one bend portion 163b in which the inner pipe 162 is held fixedly by the outer pipe 161 can be formed in a length of 700 mm of the double-wall pipe 160 to improve the vibration resistance of the double-wall pipe 160. The double-wall pipe 160 in the first embodiment is provided with the two bend portions 163b in a length of 700 mm.

The double-wall pipe 160 has the straight part 163a and the bend portions 163b. In the straight part 163a, the diameter of an imaginary cylinder connecting the outer surfaces of the ridges 162b of the inner pipe 162 is smaller than the inside diameter of the outer pipe 161 as shown in FIG. 4. In the straight part 163a, the outside surface is separated from or in partial contact with the inside surface of the outer pipe 162. Consequently, the inner pipe 162 is able to move slightly in radial directions or able to vibrate in the straight part 163a.

As shown in FIG. 3, the inner pipe 162 provided with the helical grooves 162a and the ridges 162b has a wavy wall having a pleated shape resembling a bellows. The wavy wall is deformed in the bend portion 163b as shown in FIG. 5. The respective widths of parts, on the inner side of the bend portion 163b, of the helical grooves 162a and the ridges 162b are decreased and the wavy wall is contracted. The respective widths of parts, on the outer side of the bend portion 163b, of the helical grooves 162a and the ridges 162b are increased and the wavy wall is stretched. Thus, the inner pipe 162 can be deformed inside the outer pipe 161 without inducing excessively high stresses in the part thereof corresponding to the bend portion 163b.

In the double-wall pipe 160 of the first embodiment, the outer pipe 161 has a circular cross section and the inner pipe 162 provided with the helical grooves 162 has the shape of a bellows. Thus, the outer pipe 161 and the inner pipe 162 have different shapes, respectively. When the double-wall pipe 160 formed by inserting the inner pipe 162 into the outer pipe 161 is bent, the outer pipe 161 and the inner pipe 162 are bent simultaneously. Since the outer pipe 161 and the inner pipe 162 have different shapes, respectively, the outer pipe 161 and the inner pipe 162 are strained and deformed differently. The difference between the outer pipe 161 and the inner pipe 162 in strain and deformation facilitates bringing the inside surface of the outer pipe 162 and the ridges 162b of the inner pipe 162 into contact with each other.

The inner pipe 162 is separated from the inside surface of the outer pipe 161 or is in contact with one side of the inside surface of the outer pipe 161 in the straight part 163a. The inner pipe 162 is in contact with a plurality of parts of the inside surface of the outer pipe 162 with respect to circumferential directions in the bend portion 163b. Preferably, the inner pipe 162 is in contact with a plurality of parts of the inside surface of the outer pipe 162 in the bend portion 163b so that the inner pipe 162 is unable to move radially relative to the outer pipe 161. For example, the inner pipe 162 may be in contact with at least diametrically opposite two parts or three or more circumferentially spaced parts.

Figure 8:
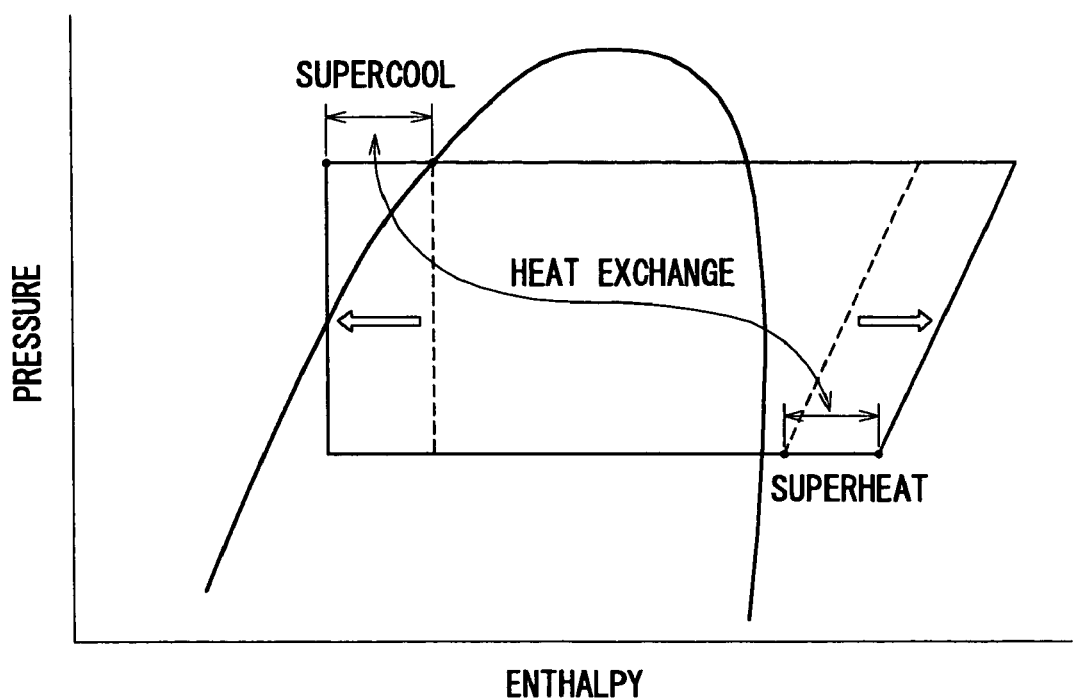
FIG. 8 is a Mollier diagram for explaining a refrigeration cycle device using the double-wall pipe.

The operation and functional effect of the double-wall pipe 160 thus constructed will be described in connection with a Mollier diagram shown in FIG. 8.

When a passenger in a passenger compartment desires to operate the air conditioning system 100 for a cooling operation, the electromagnetic clutch is engaged to drive the compressor 110 by the engine 10. Then, the compressor 110 sucks in the refrigerant discharged from the evaporator 141, compresses the refrigerant and discharges the high-temperature high-pressure refrigerant into the condenser 120. The condenser 120 cools the high-temperature high-pressure refrigerant into a liquid refrigerant state with a substantially totally liquid phase. The liquid refrigerant from the condenser 120 flows into the expansion valve 131 through the liquid tube 164 connected to the double-wall pipe 160, and through the passage 160a of the double-wall pipe 160. The expansion valve 131 reduces the pressure of the liquid refrigerant and allows the liquid refrigerant to expand. The evaporator 141 evaporates the liquid refrigerant into a substantially saturated gas refrigerant having a degree of superheat in the range of 0° C. to 3° C. The refrigerant evaporated by the evaporator 141 absorbs heat from air flowing through the evaporator 141 to cool the air to be blown into the passenger compartment. The saturated gas refrigerant evaporated by the evaporator 141, that is, the low-temperature low-pressure refrigerant, flows through the suction pipe 165, the inner pipe 162 and the suction pipe 167 into the compressor 110.

Heat is transferred from the high-temperature high-pressure refrigerant flowing through the double-wall pipe 160 to the low-temperature low-pressure refrigerant flowing through double-wall pipe 160. Consequently, in the double-wall pipe 160, the high-temperature high-pressure refrigerant is cooled and the low-temperature low-pressure refrigerant is heated. The liquid refrigerant discharged from the condenser 120 is sub-cooled and the temperature thereof drops while the liquid refrigerant is flowing through the double-wall pipe 160. The saturated gaseous refrigerant discharged from the evaporator 141 is superheated into a gaseous refrigerant having a degree of superheat. Since the inner pipe 162 in which the low-pressure refrigerant flows is covered with the outer pipe 161, the low-pressure refrigerant is scarcely heated by heat radiated by the engine 10 and hence the reduction of the cooling performance of the refrigerant cycle device 100A can be prevented.

In the bend portions 163b of the double-wall pipe 160 in the first embodiment, the ridges 162b of the inner pipe 162 are in contact with the inside surface of the outer pipe 161 and the inner pipe 162 is partially squeezed and held in place by the outer pipe 161. Thus, the helical grooves 162a secures the passage between the outer pipe 161 and the inner pipe 162, and the inner pipe 162 can be held fixedly in the outer pipe 161 by a simple structure. Since the inner pipe 162 can be surely fixedly held in the outer pipe 161, the vibration and resonation of the outer pipe 161 and the inner pipe 162 can be prevented, the outer pipe 161 and the inner pipe 162 are prevented from striking against each other, noise will not be generated, and a breakage of the outer pipe 161 and the inner pipe 162 can be prevented.

The inner pipe 162 provided with the helical grooves 162a is easily bendable and can be bent without being greatly strained and without collapsing the passage 160a between the outer pipe 161 and the inner pipe 162. Since the inner pipe 162 can be bent without being greatly strained, the double-wall pipe 160 can be bent by a low working force.

The inner pipe 162 is provided with the plurality of helical grooves 162a. Therefore, even when one of the helical grooves 162a is obstructed, the rest of the helical grooves 162a can form the passage 160a between the outer pipe 161 and the inner pipe 162. Since the plurality of helical grooves 162a enlarges the passage 160a, resistance against the flow of the refrigerant through the passage 160a can be reduced.

Heat can be efficiently transferred from the high-pressure refrigerant flowing through the passage 160a to the low-pressure refrigerant inside the inner pipe 162 without increasing the resistance against the flow of the low-pressure refrigerant in the inner pipe 162 when the depth of the helical grooves 162a is between 5 and 15% of the outside diameter of the inner pipe 162.

Figure 9:
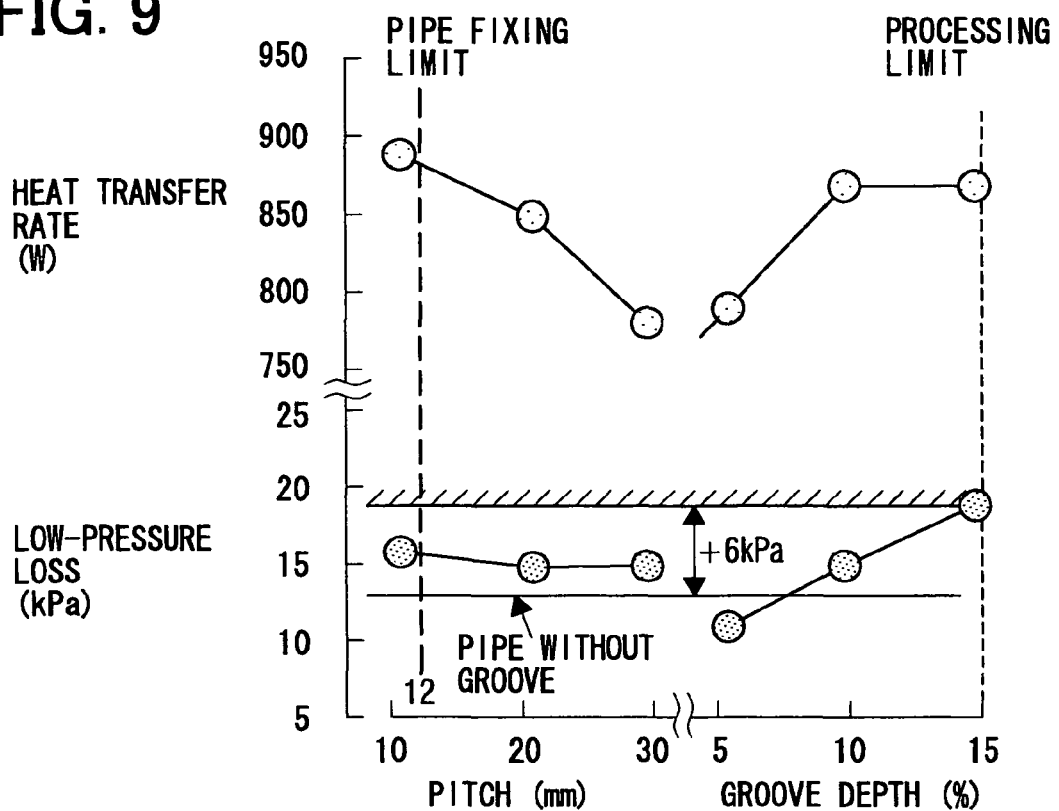
FIG. 9 is a graph showing the dependence of heat transfer rate and a pressure loss in a low-pressure pipe relative to the depth and the pitch of helical grooves.

The capability of the double-wall pipe 160 to transfer heat at a high transfer rate enables the double-wall pipe 160 to serve as an internal heat exchanger and contributes to the improvement of the efficiency of the refrigerant cycle device 100A. The low pressure loss in the double-wall pipe 160 improves the cooling capacity of the refrigerant cycle device 100A. Referring to FIG. 9, the helical grooves 162a makes the low-pressure refrigerant to flow in swirling streams in the inner pipe 162 to promote heat transfer from the high-pressure refrigerant flowing through the passage 160a to the low-pressure refrigerant flowing through the inner pipe 162 when the depth of the helical grooves 162a is not less than 5% of the outside diameter of the inner pipe 162. However, the pressure loss in the low-pressure pipe increases with the increase of the depth of the helical grooves 162a to obstruct the improvement of the cooling capacity. A pressure loss of 6 kPa in the low-pressure pip reduces the cooling capacity by 1%. The upper limit of the depth of the helical grooves 162a that causes a pressure loss increase of 6 kPa relative to a pressure loss caused by an equivalent inner pipe not provided with any grooves is 15% of the outside diameter of the inner pipe 162. The depth of the helical grooves 162a equal to 15% of the outside diameter of the inner pipe 162 is a critical depth. When the helical grooves 162a are formed in a depth exceeding 15% of the outside diameter of the inner pipe 162, flaking occurs in the surface of the inner pipe 162.

Figure 10:
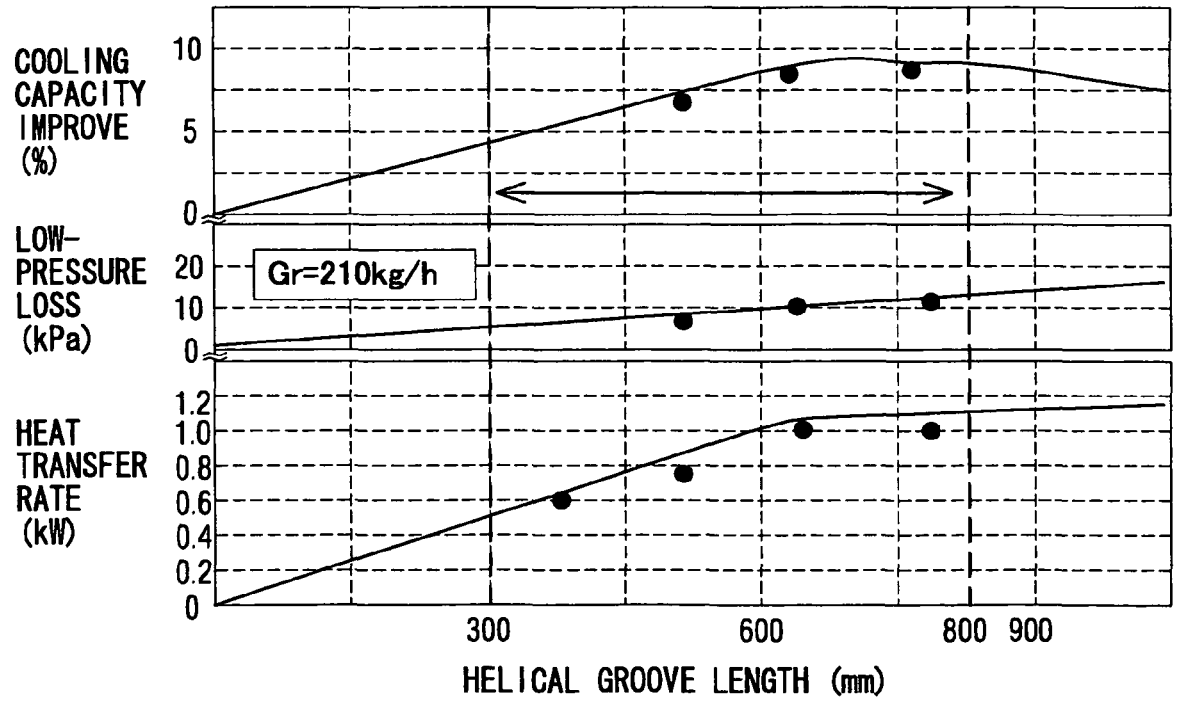
FIG. 10 is a graph showing variations of a cooling capacity, a heat transfer rate and a pressure loss in a low-pressure pipe relative to a length of helical grooves.

The refrigerant cycle device 100A has a proper cooling capacity when the longitudinal length of the helical grooves 162a is in the range of 300 to 800 mm, more preferably, in the range of 600 to 800 mm. As shown in FIG. 10, pressure loss in the low-pressure refrigerant flowing in the inner pipe 162 increases in proportion to the length of the helical grooves 162a, and the temperature difference between the low-pressure refrigerant flowing in the inner pipe 162 and the high-pressure refrigerant flowing through the passage 160a decreases as the length of the helical grooves 162a decreases. Consequently, the rate of heat transfer from the high-pressure refrigerant to the low-pressure refrigerant saturates when the length of the helical grooves 162a is increased to a length between 600 and 800 mm. The length of the helical grooves 162a corresponds to the length of the part, in which the helical grooves 162a are formed, of the inner pipe 162.

Figure 11A:
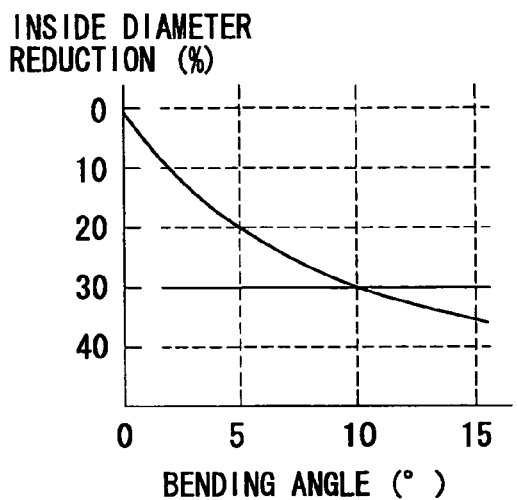
FIG. 11A is a graph showing the relationship between a variation of an inside diameter L of an outer pipe and a bending angle.
Figure 11B:
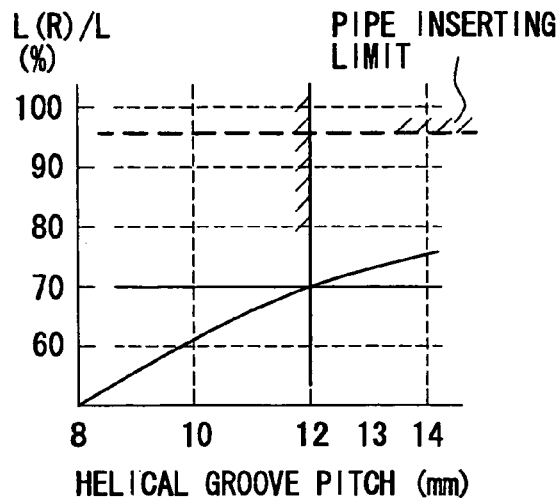
FIG. 11B is a graph showing the relationship between a helical groove pitch and a ratio L(R)/L of an outer diameter L(R) of an imaginary cylinder connecting outer surfaces of ridges of an inner pipe to the inside diameter L of the outer pipe.

The outer pipe 161 and the inner pipe 162 can be surely fixed together in the bend portions 163b when the outside diameter of the outer pipe 161 is in the range of 1.1 to 1.3 times of the outside diameter of the inner pipe 162. FIG. 11A is a graph showing the relationship between a variation rate of an inside diameter L of an outer pipe and a bending angle, and FIG. 11B is a graph showing the relationship between a helical groove pitch and a ratio L(R)/L of an outer diameter L(R) of an imaginary cylinder connecting outer surfaces of ridges of an inner pipe to the inside diameter L of the outer pipe. Generally, a tensile force acts on the outer side of a pipe and the outer side of the pipe is stretched when the pipe is bent. Consequently, the outside diameter of the pipe decreases by 10 to 30% of the original outside diameter of the pipe. A maximum reduction of 30% occurs when a bending angle of a bend portion is 10°. In this embodiment, by bending, the inside diameter of the outer pipe 161 decreases by 10 to 30% of the original inside diameter of the pipe. Thus, the outer pipe 161 and the inner pipe 162 can be surely fixed together when the bending angle is not smaller than 10°.

When the diameter L(R) of the imaginary cylinder connecting the outer surfaces of the ridges 162b of the inner pipe 162 is in the range of 0.7 to 0.95 or 0.8 to 0.95 times of the original inside diameter L of the outer pipe 161, the outer pipe 161 and the inner pipe 162 can be surely fixed together in the bend portion 163b and the double-wall pipe 160 has satisfactory vibration resistance when the bending angle is 10° or above as shown in FIG. 11B. The diameter L(R) of the imaginary cylinder connecting the outer surfaces of the ridges 162b decreases with the decrease of the pitch of the helical grooves 162a. Therefore, it is desirable that the pitch of the helical grooves 162a is 12 mm or above to ensure that the diameter L(R) of the imaginary cylinder connecting the outer surfaces of the ridges 162b is equal to or greater than 0.7 times of the original inside diameter L of the outer pipe 161. When the outer pipe 161 does not have high straightness, it is difficult to insert the inner pipe 162 into the outer pipe 161 and the productivity of the double-wall pipe manufacturing line lowers. Therefore, it is desirable that the diameter L(R) of the imaginary cylinder connecting the outer surfaces of the ridges 162b is equal to or smaller than 95% of the inside diameter of the outer pipe 161.

Figure 12:
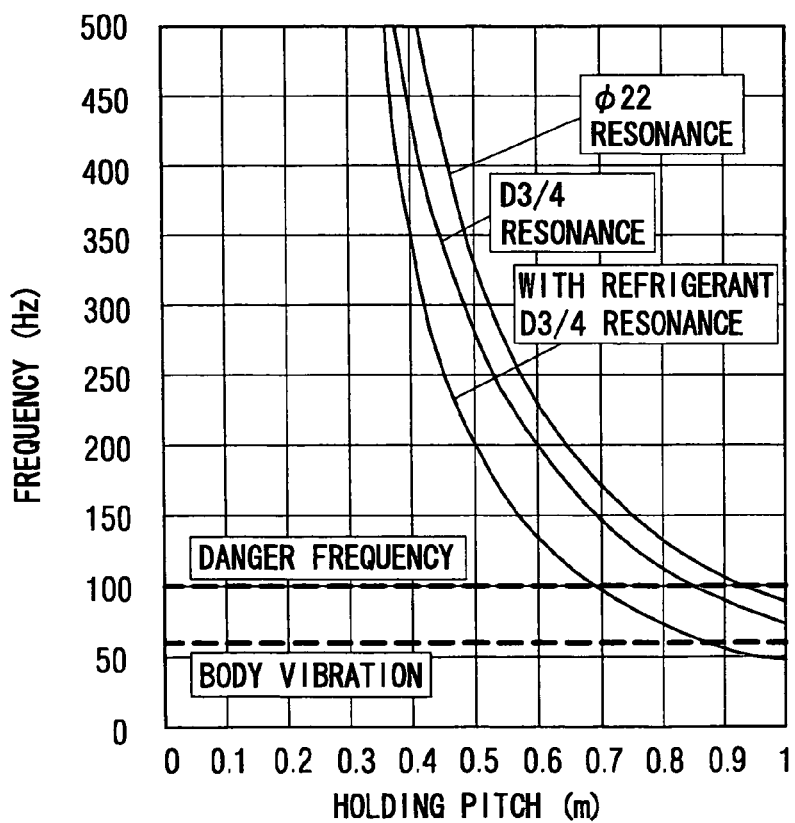
FIG. 12 is a graph showing the relationship between a resonance frequency and a holding pitch.

Resonating of the double-wall pipe 160 with the vibration of the vehicle can be prevented by forming at least one bend portion 163b in a length of 700 mm of the double-wall pipe 160. As shown in FIG. 12, resonance frequency decreases with the increase of the length of the bend portion 163b in which the outer pipe 161 and the inner pipe 162 are fixed together. The length between the bend portions 163b will be called a holding pitch. Suppose that the frequency of the vibration of the body of the vehicle is 50 Hz. Then, the holding pitch for a ¾ in. pipe carrying the refrigerant and resonating with vibrations of 100 Hz is 700 mm. In this case, the double-wall pipe 160 can be prevented from resonating with the vibration of the vehicle by forming the bend portions 163b in the double-wall pipe 160 at pitches of 700 mm, and generation of noise, abrasion of the outer pipe 161 and the inner pipe 162 and production of particles due to the striking of the outer pipe 161 and the inner pipe 162 against each other can be prevented.

The respective positions of the free ends of the liquid tubes 164 and 165 can be properly adjusted by properly forming the bend portions 164a and 165a in the liquid tubes 164 and 165, respectively. The bend portions 164a and 165a are formed between the fixed ends blazed to the outer pipe 162 and the free ends of the liquid tubes 164 and 165a, that is, branch pipes. The liquid tubes 164 and 165 are formed in excess lengths, respectively, to provide the liquid tubes 164 and 165 with bending allowances for the positional adjustment of the free ends thereof. When the bend portions 164a and 165a are formed in the liquid tubes 164 and 165 to adjust the positions of the free ends of the liquid tubes 164 and 165, stresses are induced in the bend portions 164a and 165a to suppress the induction of stresses in the blazed ends. Thus, the positions of the free ends of the liquid tubes 164 and 165 can be easily adjusted, and the liquid tubes 164 and 165 can be connected easily to the condenser 120 and the expansion valve 131, respectively, which facilitates assembling work.

As mentioned above in connection with FIG. 7, the three balls 220 of the grooving tool 200 are pressed against the outer surface of the inner pipe 162 and the annular block 210 holding the balls 220 is rotated to form the three helical grooves 162a. Formation of the three helical grooves 162a with the three balls 220 pressed against the surface of the inner pipe 162 improves the straightness of the inner pipe 162. Consequently, the inner pipe 162 can be smoothly inserted into the outer pipe 161 even when the difference between the outside diameter of the inner pipe 162 and the inside diameter of the outer pipe 161 is small. Fixing force for fixing the outer pipe 161 and the inner pipe 162 in the bend portion 163b is higher and the vibration resistance of the double-wall pipe 160 is higher when the gap between the outer pipe 161 and the inner pipe 162 is narrower.

When the pressure tightness of the outer pipe 161 in the bend portion 163b is important, it is preferable that the minimum outside diameter of the outer pipe 161 in the bend portion 163b is 0.85 times of the original outside diameter L0 of the outer pipe 161 or greater. When the outer pipe 161 is bent to form the bend portion 163b such that the minimum outside diameter of the outer pipe 161 is 85% of the original outside diameter of the outer pipe 161 or below, the outer pipe 161 in the bend portion 163b has an elliptic section. When the outer pipe 161 is bent and has an elliptic section, the bending angle in which the outer pipe 161 is bent tends to decrease when the high-pressure refrigerant flows through the passage 160a between the outer pipe 161 and the inner pipe 162. Consequently, a force not lower than 600 μs that causes the fatigue fracture of aluminum pipes acts on the outer side of the curved outer pipe 161 and cracks may be developed in the outer side of the outer pipe 161. Therefore, the outer pipe 161 has sufficient pressure tightness when the minimum outside diameter of the outer pipe 161 in the bend portion 163b is 0.85 times of the original outside diameter L0 of the outer pipe 161 or above.

Second Embodiment

A double-wall pipe 160 in a second embodiment according to the present invention will be described with reference to FIGS. 13A and 13B. The double-wall pipe 160 in the second embodiment includes a holding member 168. The holding member 168 fixedly holds end parts of a liquid tube 165 and a suction tube 166 in a predetermined positional relation.

Figure 13A:
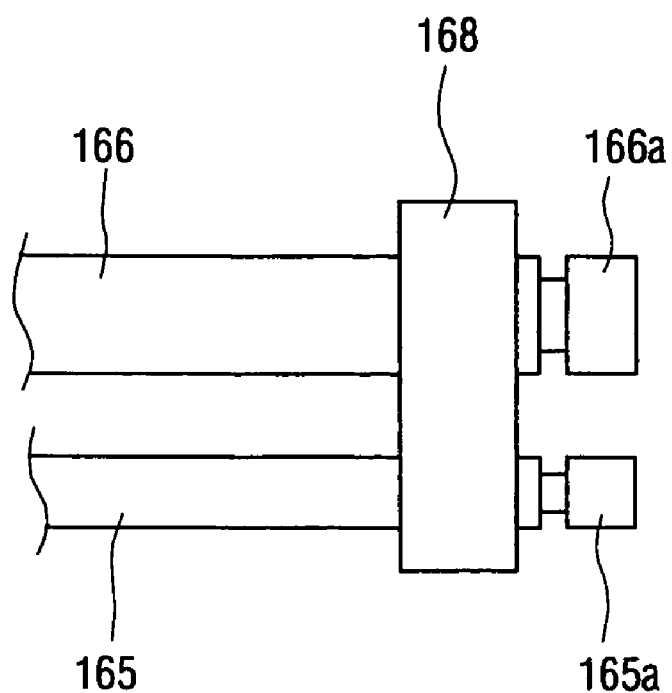
FIGS. 13A and 13B are side views showing fixing members, respectively.

As shown in FIG. 13A, the holding member 168, similarly to the liquid tube 165 and the suction tube 166, is made of aluminum. The holding member 168 is fastened to the liquid tube 165 and the suction tube 166 by blazing or staking.

The end parts of the liquid tube 164 and the suction tube 166 fixedly held by the holding member 168 are unmovable relative to each other. Consequently, the liquid tube 164 and the suction tube 166 can be easily connected to the expansion valve 131 and the evaporator 141, respectively.

Figure 13B:
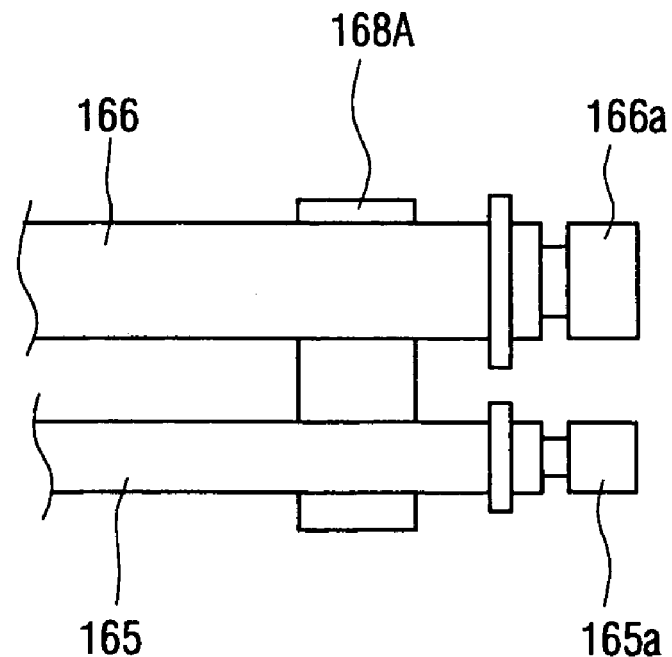

As shown in FIG. 13B, a holding member 168A made of a resin may be used. The holding member 168A can be fixedly put on the liquid tube 165 and the suction tube 166 to hold the liquid tube 165 and the suction tube 166. The holding member 168A made of a resin can be formed in a low cost. In the second embodiment, the other parts can be made similarly to those of the above-described first embodiment.

Third Embodiment

Figure 14:
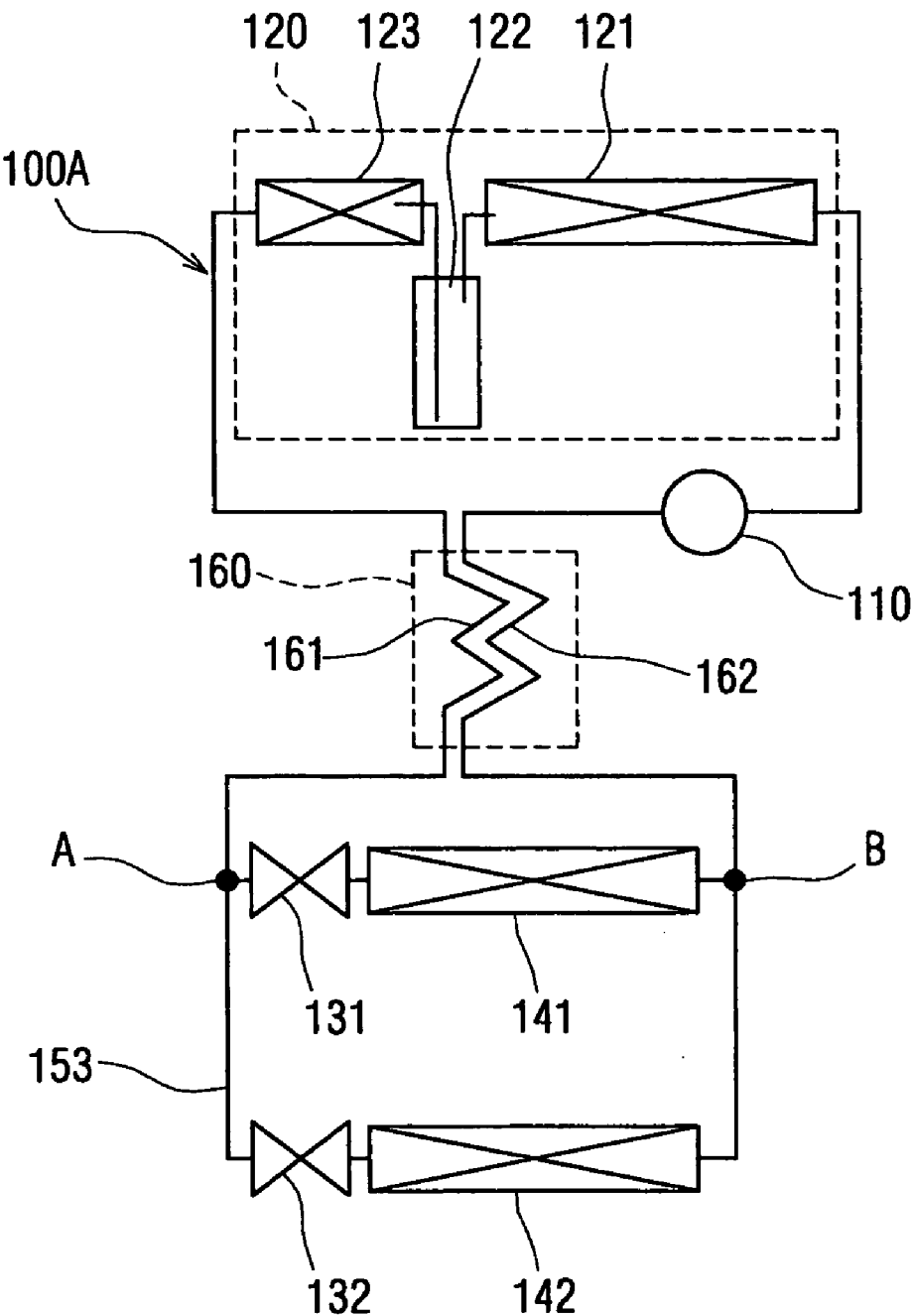
FIG. 14 is a schematic diagram showing a refrigerant cycle device using a double-wall pipe, for a dual air conditioning system.

FIG. 14 shows a double-wall pipe 160 in a third embodiment according to the present invention. The double-wall pipe 160 in the third embodiment can be used for a refrigerant cycle device 100A of a dual air conditioning system provided with an evaporator for a rear area in a passenger compartment of a vehicle.

The refrigerant cycle device 100A includes a first circuit including a first expansion valve 131 and a first evaporator 141 (first low-pressure heat exchanger), and a second circuit including a second expansion valve 132 and a second evaporator 142 (second low-pressure heat exchanger). The first circuit and the second circuit are connected in parallel by using a bypass passage 153 through which refrigerant flows while bypassing the first evaporator 141 and the first expansion valve 131. The bypass passage 153 is connected to the first circuit at a branching point A and a joining point B, so as to form the second circuit. A condenser 120 includes a condensing unit 121, a gas-liquid separator 122 and a super-cooling unit 123.

The double-wall pipe 160 has an outer pipe 161 extending between the condenser 120 and the branching point A of the bypass passage 153, and an inner pipe 162 extending between the joining point B of the bypass passage 153 and a compressor 110.

The high-pressure refrigerant super-cooled through heat exchange in the double-wall pipe 160 flows through the first evaporator 141 and the second evaporator 142. Thus, the pre-cooling function in both the evaporators 141 and 142 can be obtained.

Figure 15:
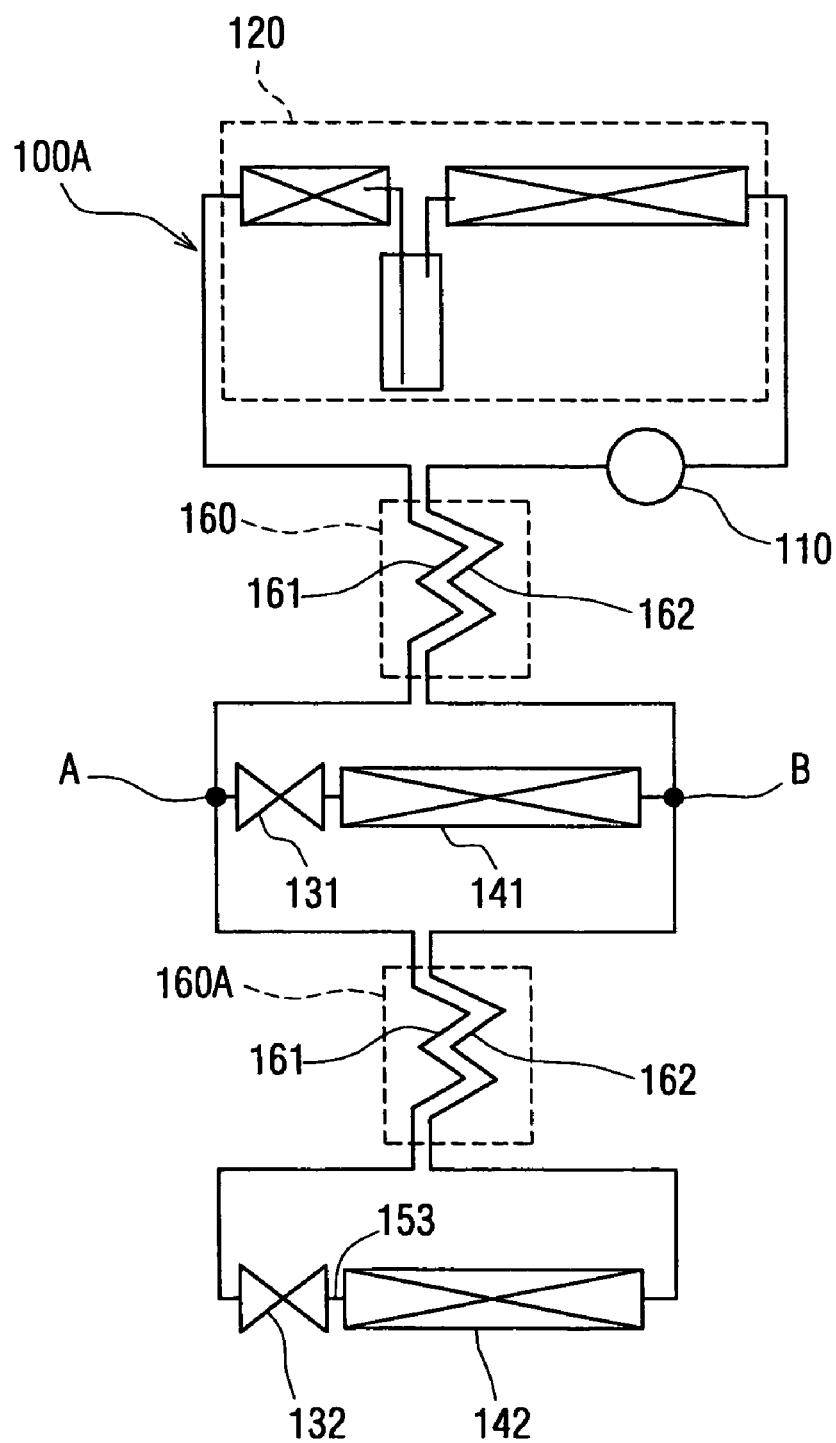
FIG. 15 is a schematic diagram showing a refrigerant cycle device using two double-wall pipes, for a dual air conditioning system.

Another double-wall pipe 160A may be used in combination with the double-wall pipe 160 as shown in FIG. 15. The outer pipe 161 of the double-wall pipe 160A extends between the branching point A of the bypass passage 153 and the second expansion valve 132 and the inner pipe 162 of the double-wall pipe 160A extends between the second evaporator 142 and the joining point B of the bypass passage 153.

The high-pressure refrigerant super-cooled through heat exchange in the double-wall pipe 160A flows through the second evaporator 142. Thus, the cooling performance of the second evaporator 142 can be improved. In the third embodiment, the structures of the double-wall pipe 160, 160A can be formed similar to those of the above-described first embodiment.

Other Embodiments

Although the present invention has been described in connection with some preferred embodiments thereof with reference to the accompanying drawings, it is to be noted that various changes and modifications will become apparent to those skilled in the art.

For example, the inner pipe 162 may be provided with any suitable number (e.g., one or plural) of helical grooves instead of the three helical grooves 162a. Further, the inner pipe 162 may be provided with longitudinal, straight grooves instead of the helical grooves.

The liquid tubes 164 and 165 may be straight tubes, provided that the liquid tubes 164 and 165 can be properly connected to the relevant devices.

Pipes made of a material other than aluminum, such as steel or copper, may be used instead of the pipes 161 and 162 made of aluminum.

Although the double-wall pipe 160 of the invention has been described as used to the refrigerant cycle device 100A of the automotive air conditioning system 100, the present invention is not limited thereto in its practical application. The double-wall pipe 160 may be suitably used for domestic air conditioners. When the double-wall pipe 160 is used for the domestic air conditioner, the temperature of the atmosphere around the outer pipe 161 is lower than that of air in the engine room 1. Therefore, the low-pressure refrigerant can be set to pass through the passage 160a and the high-pressure refrigerant can be set to pass through the inside passage of the inner pipe 162 when the heat transferring condition between the high-pressure refrigerant and the low-pressure refrigerant permits.

The refrigerant that flows through the double-wall pipe 160 is not limited to the refrigerant employed in the refrigerant cycle device 100A, a refrigerant having physical properties different from those of the refrigerant employed in the refrigerant cycle device 100A may be used. For example, refrigerant flowing in different directions, refrigerants respectively having different temperatures or refrigerants respectively having different pressures may be used in combination. Furthermore, different fluids other than the refrigerant of the refrigerant cycle device 100A can be used in the double-wall pipe.

While the invention has been described with reference to preferred embodiments thereof, it is to be understood that the invention is not limited to the preferred embodiments and constructions. The invention is intended to cover various modification and equivalent arrangements. In addition, while the various elements of the preferred embodiments are shown in various combinations and configurations, which are preferred, other combinations and configuration, including more, less or only a single element, are also within the spirit and scope of the invention.

What is claimed is:

1. A double-wall pipe comprising:
an outer pipe; and
an inner pipe disposed inside the outer pipe, the inner pipe having thereon three or more separate ridge portions defining an outer portion of an outer surface of the inner pipe, the ridge portions defining a groove portion extending in a longitudinal direction of the inner pipe, the groove portion defining an inner portion of the outer surface of the inner pipe; wherein:
the three or more separate groove portions are three or more separate helical grooves winding around the inner pipe and extending the longitudinal direction;
each of the helical grooves have a groove depth that is in a range of 5% to 15% of an outside diameter of the inner pipe;
the outer pipe and the inner pipe are bent to have a straight portion extending straightly, and a bend portion bent from the straight portion;
the outer pipe has an inside diameter that is larger than an outside diameter of an imaginary cylinder defined by an outer surface of the ridge portions of the inner pipe, in the straight portion;
the outside diameter of the imaginary cylinder defined by the outer surface of the ridge portions of the inner pipe in the straight portion is in a range of 0.7 to 0.95 of the inside diameter of the outer pipe in the straight portion; and
the outer pipe is deformed in a radial direction in the bend portion to radially squeeze the inner pipe such that the three or more separate ridge portions of the inner pipe are all in direct contact with an inside surface of the outer pipe.

2. The double-wall pipe according to claim 1, wherein the number of the helical grooves is three.

3. The double-wall pipe according to claim 1, wherein the groove has portions each have a longitudinal length that is in a range of 300 mm to 800 mm.

4. The double-wall pipe according to claim 1, wherein the outer pipe has an outside diameter that is in a range of 1.1 to 1.3 times of an outside diameter of the inner pipe.

5. The double-wall pipe according to claim 4, wherein the outer pipe has a minimum outside diameter in the bend portion, which is equal to or larger than 0.85 times of an outside diameter of the outer pipe in the straight portion.

6. The double-wall pipe according to claim 1, further comprising a branch pipe branching out from a longitudinal end part of the outer pipe.

7. The double-wall pipe according to claim 6, further comprising a connecting pipe connected to a longitudinal end of the inner pipe.

8. The double-wall pipe according to claim 7, further comprising a holding member, which holds and fixes the branch pipe and the connecting pipe in a predetermined positional relation.

9. The double-wall pipe according to claim 8, wherein the holding member is brazed to the branch pipe and the connecting pipe.

10. The double-wall pipe according to claim 8, wherein the holding member is fitted to the branch pipe and the connecting pipe.

11. The double-wall pipe according to claim 6, wherein the branch pipe is disposed to have a deformable portion for adjusting an end position of the branch pipe.

12. The double-wall pipe according to claim 11, wherein the deformable portion is a bending portion provided in the branch pipe.

13. The double-wall pipe according to claim 1, wherein at least one of the bend portions is provided in a longitudinal length of 700 mm of the outer pipe and the inner pipe.

14. The double-wall pipe according to claim 1, wherein the outer pipe and the inner pipe are made of aluminum.

15. The double-wall pipe according to claim 1, wherein the inner pipe defines an inner passage, a low-temperature refrigerant being disposed within the inner passage, and the inner pipe is disposed inside the outer pipe to define an outer passage therebetween, a high-temperature refrigerant having a temperature higher than a temperature of the low-temperature refrigerant being disposed within the outer passage.

16. The double-wall pipe according to claim 1, wherein the inner pipe defines an inner passage, a low-temperature low-pressure refrigerant being disposed within the inner passage, and the inner pipe is disposed inside the outer pipe to define an outer passage therebetween, a high-temperature high-pressure refrigerant having a temperature and a pressure higher than a temperature and a pressure of the low-temperature low-pressure refrigerant being disposed within the outer passage.

* * * * *